United States Patent [19]

Hemsarth et al.

[11] 4,263,740
[45] Apr. 28, 1981

[54] CRAWLING INSECT TRAP

[75] Inventors: W. Lance H. Hemsarth, W. Orange; Harold E. Rife, Millington, both of N.J.

[73] Assignee: American Home Products Corp., New York, N.Y.

[21] Appl. No.: 19,218

[22] Filed: Mar. 9, 1979

[51] Int. Cl.³ .............................................. A01M 1/14
[52] U.S. Cl. ........................................ 43/114; 43/121
[58] Field of Search ................................ 43/114, 121

[56] References Cited

U.S. PATENT DOCUMENTS

| | | |
|---|---|---|
| 109,282 | 11/1870 | Williams . |
| 140,954 | 5/1973 | Rubarth . |
| 400,460 | 4/1889 | Jennings . |
| 1,667,048 | 4/1928 | Rawlings ........................ 43/121 X |
| 2,167,978 | 8/1939 | Jennerich ........................ 43/121 |
| 2,606,391 | 8/1952 | McGrew ........................ 43/121 |
| 2,997,806 | 8/1961 | Duvall ........................ 43/121 |
| 4,044,495 | 8/1977 | Nishimura ........................ 43/121 |

FOREIGN PATENT DOCUMENTS 79498   6/1894   Fed. Rep. of Germany ............. 43/121

Primary Examiner—Nicholas P. Godici
Attorney, Agent, or Firm—Arthur E. Wilfond

[57] ABSTRACT

In a crawling insect trap, an inwardly sloping decline covered with and loosely adhering particulate material, where upon crawling insect when attempting to walk up said decline, causes the loosely adhering particulate material to give way and causing the insect to fall into the interior of the trap.

8 Claims, 3 Drawing Figures

CRAWLING INSECT TRAP

BACKGROUND OF THE INVENTION

The instant invention relates to traps for crawling insects, such as ants.

There is much early interest in crawling insect traps such as evidenced by U.S. Pat. No. 109,282 of Nov. 15, 1870 to Williams; U.S. Pat. No. 140,954 of July 15, 1873 to Rubarth and U.S. Pat. No. 400,460 of Apr. 2, 1889 to Jennings. The Williams' patent describes a truncated pyramidal shaped box open at the top. Suspended from the top is a cylindrical or slightly conical vessel opened at both ends, made of glass or otherwise provided with a highly polished and smoothened inner surface. Food of some type, which is apt to attract the insect, is placed within the box. The insects or bugs supposedly, readily ascend the inclined sides of the box where they can see or perceive the food at the bottom of the same and either drop themselves into the box or descend along the smooth sides of the cylinder from which they allegedly cannot reascend. Rubarth discloses ant traps, which are placed in the opening of a large conical mound of earth at the entrance of an ant nest. The trap is so designed that ants either upon exiting or entering the nest, first walk over a sanded or otherwise roughened surface to afford an easy foot-hold for the ants. Thereafter, the ants cross an annular flange or overhang of glass and fall within the body of the trap from whence they allegedly cannot escape. Jennings shows a box or receptacle of any convenient shape, having outer sides of moderately rough material affording a foothold for a crawling insect. A downwardly sloping inner flange is present having a roughened zone extending from the outer edge towards the center and a polished zone extending from the roughened zone to the lower edge of the flange. Both the said zones being located on the same inclined surface. Thus, when an ant or other crawling insect passes from one zone to the other, it is unable to turn around or recover itself and the weight of its body carries it down the polished zone into the trap. All of these traps suffer from the same drawback, that is, ants and other crawling insects, as further described hereinbelow, are capable of walking on glass surfaces and thus can exit any of the above traps.

SUMMARY OF THE INVENTION

The crawling insect trap of the present invention obviates the deficiency in the above mentioned prior art traps in the ability of ants and other crawling insects of walking on glass or polished surfaces, by providing on an inwardly sloping decline, a loosely adhering particular material having an angle of repose such that ants or other crawling insects can walk downwardly thereon but when turning around are unable to maintain footing and causing an avalanche similar to that caused by an ant in the trap of an ant lion. An ant lion is any of various neuropterous insects having a long-jawed larva that digs a conical pit in which it lies in wait to catch insects, such as ants, upon which it feeds.

Figure 1:
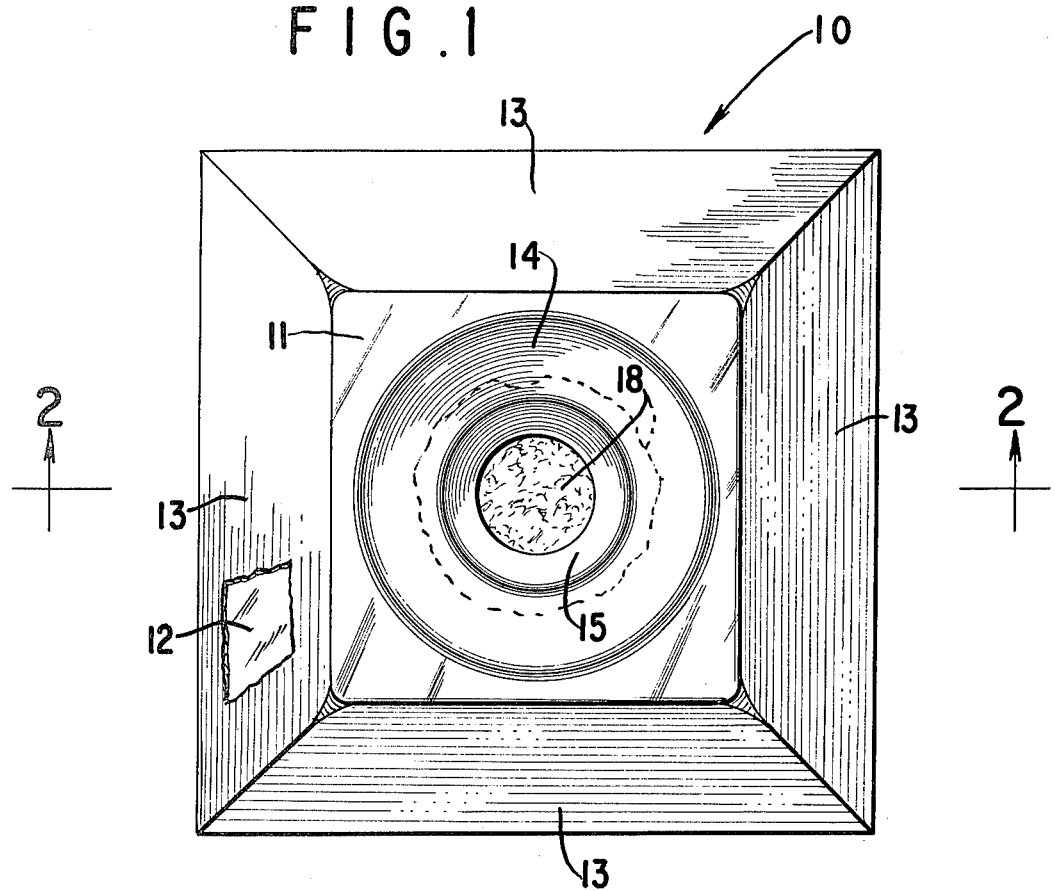
FIG. 1 shows a plan view of an insect trap according to the present invention.
Figure 2:
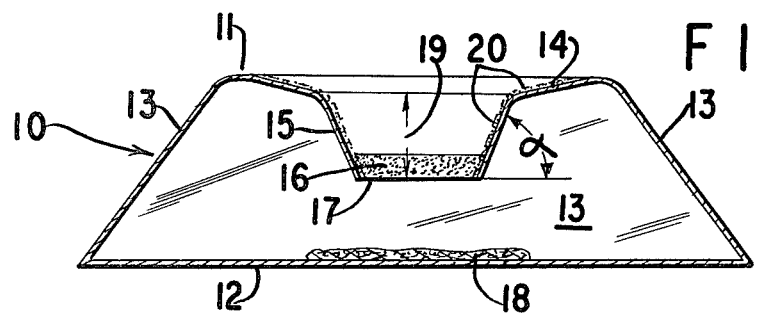
FIG. 2 shows a cross-section along line 2—2 of FIG. 1.

The invention will further be described with reference to the drawing, wherein the same number in the various figures has identical meaning. Shown in FIGS. 1 and 2 is a crawling insect trap comprising an upper surface 11, a bottom surface 12 and side walls 13 in the general configuration of a truncated pyramid. Although the side walls are shown at approximately a 45° angle with the bottom, this angle is arbitrary. The general overall configuration can also be modified so that instead of being a truncated pyramid, it could be a truncated cone or ovaloid, or another desired shape. Extending downwardly from the top is an inwardly sloping ramp 14, which ends in an inwardly sloping decline 19 having an outer zone 15 and an inner zone 16. The angle of inclination, or elevation, $\alpha$, of the decline should be from 5° to 180°, although between 10° and 90° is preferred and 45° to 90° most preferred. The angle of inclination of the ramp is from about 5° to 10°.

At the end of the inner zone, 16, is an opening, 17, into the interior of the trap 10. Beneath the opening, and at least co-extensive therewith, although preferably covering the entire surface, is a thin layer 18 of glue or oil so that the insect, once within the interior of the trap, is held fast therein. The trapped insect ultimately dies by starvation by being stuck in the glue. As another alternative, when oil is used, the insect may drown in the oil. As still another alternative, the insect may die from starvation by its mere inability to exit from the trap. Although to this point, the description of the trap of the present invention does not seem too dissimilar from the trap of Williams, a brief discussion of the physiology of locomotion of a crawling insect clearly points out why the insect trap of the present invention succeeds where the prior art insect traps fail.

Figure 3:
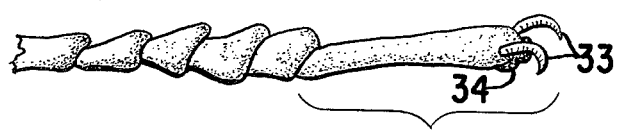
FIG. 3 shows the distal portion of the leg of a typical crawling insect, such as an ant.

FIG. 3 shows the distal or end portion of a typical crawling insect leg. At the end of the tarsus, 31, is a pre-tarsus, 32, having both tarsal claws, 33, and a sticky pad or pulvilli, 34. Walking is usually carried out by utillization of both the tarsal claws and pulvilli. When an insect walks on a smooth surface such as glass or plastic, on which the claws have nothing to grab, the pulvilli are sufficiently functional for walking. Thus, it is possible for an ant to walk up or down a glass or plastic surface or for that matter to even walk upside down on such a surface. The outer zone of the inwardly sloping decline is coated with a thin layer of particulate material, 20, having an angle of repose, such that the ant or other crawling insect can walk downwardly thereon without difficulty. Obviously, and preferably, the ramp can also be coated with said particulate material. The ramp and decline can also be coplanar and coterminous. The inner zone of the downwardly sloping decline is coated with an attractant which can vary from pheromones to natural or synthetic food attractants such as honey, sugar, vegtable oils, flavorings, perfumes, etc. In operation, the ant must cross over the particulate layer before reaching the attractant. Thus, the ant advances downwardly towards the opening. As the ant walks upon the loosely adhering particles, these particles adhere to and cover the pulvilli so that they are no longer suitable for their intended function of maintaining a foothold on a smooth surface. As the insect when turning around, grabs by the tarsal claws onto the particulate material, which may be other organic or inorganic such as, the tarsal claws onto the particulate material, which may be other organic or inorganic such as, Teflon, sand, clay, such as ground pyrophyllite-aluminum silicate, cellulosic compounds, talc, flour, etc., the particles give way. Thus, the insect creates an avalanche and falls through the opening 17 into the interior of the trap.

Although it is preferred that at least the portion of the trap beneath the opening be coated with a glue such as described hereinabove, if nothing is present to maintain the insect within the trap, the insect can attempt to exit from the trap but again causes an avalanche falling to the bottom of the trap. This would be repeated, until finally by exhaustion and/or starvation, the insect expires.

The particulate material varies from less than 1 micron to more than 1000 microns in diameter, and preferably from 100 to 300 microns in diameter, and is preferably applied in a dispersion to the ramp or inwardly sloping decline. When the dispersion dries, the particles form a film, which adheres to the surface and will not fall off when the trap is shaken but will release from the surface when pressure is directly applied to the film. Particularly useful are tetrafluroroethylene or ground pyrophyllite-aluminum silicate. The former is available under the name Teflon from E. I. Dupont De Nemours & Co., Inc. and the latter is available under the name Pyrax from R. T. Vanderbilt Co., Inc.

As an alternative, the outer and inner zones of the trap can be merged into a single zone and coated with a layer of particular material having an attractant thereon. In this event, the crawling insect seeks the attractant and in its meanderings over the trap passes the angle beyond which, its grasping the particulate material with the tarsal claws upsets the equilibrium of the particulate material causing an avalanche taking the insect into the interior of the trap.

The crawling insect trap of the present invention can be made of paper, wax, plastic or metal provided the inwardly sloping decline can be coated with a layer of particular material to adhere sufficiently so as not to fall off on standing but loose enough so as to come loose when walked upon by a crawling insect. Although any of the enumerated materials will suffice, moldable plastics, such as polystyrene, are preferred.

We claim:

1. In a crawling insect trap comprising an upper surface, a bottom surface and side walls, having an opening in said upper surface leading to the interior of said crawling insect trap, a layer of glue within said trap covering at least a portion of said bottom surface, and an inwardly sloping ramp, having an angle of inclination, as measured from a plane parallel to said bottom surface, of from about 5° to 10°, coterminous with an inwardly sloping decline having a final angle of elevation, as measured from a plane parallel to said bottom surface, of from 10° to 90°, covered with at least a particulate material, which will come loose when walked upon by a crawling insect causing the insect to fall through said opening into said trap and to be held fast therein by said layer of glue.

2. The crawling insect trap of claim 1, wherein the particular material and an attractant cover the inwardly sloping decline.

3. The crawling insect trap of claim 2, wherein the inwardly sloping decine has an outer zone and an inner zone, said outer zone is covered with a layer of the loosely adhering particulate material and said inner zone is covered with the attractant.

4. The crawling insect trap of claim 1, wherein the final angle of elevation is from 45° to 90°.

5. The crawling insect trap of claim 4, wherein the size of the particulate material is from 1 to 1000 microns.

6. The crawling insect trap of claim 5, wherein the size of the particulate material is from 100 to 300 microns.

7. The crawling insect trap of claim 4, wherein the particulate material is tetrafluoroethylene resin or a ground pyrophyllite-aluminum silicate.

8. In an ant trap comprising an upper surface, a bottom surface and side walls, having an opening in said upper surface leading to the interior of said crawling insect trap, a layer of glue within said trap covering at least a portion of said bottom surface, and an inwardly sloping ramp, having an angle of elevation, as measured from a plane parallel to said bottom surface, of from about 5° to 10°, coterminous with an inwardly sloping decline with a final angle of elevation, as measured from a plane parallel to said bottom surface, of from 10° to 90°, covered with at least particulate tetrafluoroethylene resin or a ground pyrophyllite-aluminum silicate, which will come loose when walked upon by an ant causing the ant to fall through said opening into said trap and to be held fast therein by said layer of glue.

* * * * *